US008951323B2

(12) United States Patent
Kumar

(10) Patent No.: US 8,951,323 B2
(45) Date of Patent: Feb. 10, 2015

(54) MULTIPLE LAYER MAT AND EXHAUST GAS TREATMENT DEVICE

(75) Inventor: Amit Kumar, Getzville, NY (US)

(73) Assignee: Unifrax I LLC, Tonawanda, NY (US)

( * ) Notice: Subject to any disclaimer, the term of this patent is extended or adjusted under 35 U.S.C. 154(b) by 334 days.

(21) Appl. No.: 12/890,065

(22) Filed: Sep. 24, 2010

(65) Prior Publication Data
US 2011/0126499 A1 Jun. 2, 2011

Related U.S. Application Data

(60) Provisional application No. 61/245,437, filed on Sep. 24, 2009.

(51) Int. Cl.
B01D 50/00 (2006.01)
B01D 39/06 (2006.01)
B01D 39/14 (2006.01)
B01D 39/20 (2006.01)
B01D 24/00 (2006.01)
B32B 5/26 (2006.01)
B32B 17/02 (2006.01)
B32B 19/06 (2006.01)
D04H 1/4209 (2012.01)
D04H 1/4218 (2012.01)
D04H 1/542 (2012.01)
D04H 1/587 (2012.01)
D21H 13/36 (2006.01)
D21H 27/38 (2006.01)
F01N 3/28 (2006.01)

(52) U.S. Cl.
CPC . *B32B 5/26* (2013.01); *B32B 17/02* (2013.01); *B32B 19/06* (2013.01); *D04H 1/4209* (2013.01); *D04H 1/4218* (2013.01); *D04H 1/542* (2013.01); *D04H 1/587* (2013.01); *D21H 13/36* (2013.01); *D21H 27/38* (2013.01); *F01N 3/2857* (2013.01)
USPC ............ 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182; 60/297
See application file for complete search history.

(56) References Cited

U.S. PATENT DOCUMENTS

| | | |
|---|---|---|
| 3,224,927 A | 12/1965 | Brown et al. |
| 3,458,329 A | 7/1969 | Owens et al. |
| 3,649,406 A | 3/1972 | McNish |
| 3,771,967 A | 11/1973 | Nowak |
| 3,798,006 A | 3/1974 | Balluff |
| 3,916,057 A | 10/1975 | Hatch et al. |
| 3,996,145 A | 12/1976 | Hepburn |
| 4,048,363 A | 9/1977 | Langer et al. |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,159,205 A | 6/1979 | Miyahara et al. |
| 4,204,907 A | 5/1980 | Korklan et al. |
| 4,239,733 A | 12/1980 | Foster et al. |
| 4,269,807 A | 5/1981 | Bailey et al. |
| 4,271,228 A | 6/1981 | Foster et al. |
| 4,277,269 A | 7/1981 | Sweeting |
| 4,279,864 A | 7/1981 | Nara et al. |
| 4,305,992 A | 12/1981 | Langer et al. |
| 4,328,187 A | 5/1982 | Musall et al. |
| 4,332,852 A | 6/1982 | Korklan et al. |
| 4,335,077 A | 6/1982 | Santiago et al. |
| 4,353,872 A | 10/1982 | Midorikawa |
| 4,385,135 A | 5/1983 | Langer et al. |
| 4,617,176 A | 10/1986 | Merry |
| 4,693,338 A | 9/1987 | Clerc |
| 4,735,757 A | 4/1988 | Yamamoto et al. |
| 4,746,570 A | 5/1988 | Suzaki et al. |
| 4,752,515 A | 6/1988 | Hosoi et al. |
| 4,797,263 A | 1/1989 | Oza |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |

(Continued)

FOREIGN PATENT DOCUMENTS

DE 196 38 542 A1 3/1997
EP 0 205 704 A1 12/1986

(Continued)

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
Maret, Gulati, Lambert & Zink. Systems Durability of a Ceramic Racetrack Converter. International Fuels and Lubricants Meeting, Toronto, Canada, Oct. 7-10, 1991.
English language abstract of DE 19858025; Publication Date: Jun. 21, 2000; Applicant: Aslgawo GmbH.
Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK— Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.

(Continued)

*Primary Examiner* — Amber Orlando
(74) *Attorney, Agent, or Firm* — Curatolo Sidoti Co., LPA; Joseph G. Curatolo; Salvatore A. Sidoti

(57) ABSTRACT

A hybrid mounting mat for mounting a catalyst support structure within a housing in an exhaust gas treatment device. The exhaust gas treatment device includes an outer housing, a fragile catalyst support structure, and a mounting mat disposed in the gap between the housing and the fragile catalyst support structure. Additionally disclosed are methods of making the hybrid mounting mat and for making an exhaust gas treatment device incorporating the mounting mat.

35 Claims, No Drawings

(56) References Cited

U.S. PATENT DOCUMENTS

| | | | |
|---|---|---|---|
| 4,985,212 A | 1/1991 | Kawakami et al. | |
| 4,999,168 A | 3/1991 | Ten Eyck | |
| 5,008,086 A | 4/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,145,811 A | 9/1992 | Lintz et al. | |
| 5,151,253 A | 9/1992 | Merry et al. | |
| 5,242,871 A | 9/1993 | Hashimoto et al. | |
| 5,250,269 A | 10/1993 | Langer | |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,332,699 A | 7/1994 | Olds et al. | |
| 5,340,643 A | 8/1994 | Ou et al. | |
| 5,346,868 A | 9/1994 | Eschner | |
| 5,376,341 A | 12/1994 | Gulati | |
| 5,380,580 A | 1/1995 | Rogers et al. | |
| 5,384,188 A | 1/1995 | Lebold et al. | |
| 5,389,716 A | 2/1995 | Graves | |
| 5,453,116 A | 9/1995 | Fischer et al. | |
| 5,482,686 A | 1/1996 | Lebold et al. | |
| 5,488,826 A | 2/1996 | Paas | |
| 5,523,059 A | 6/1996 | Langer | |
| 5,580,532 A | 12/1996 | Robinson et al. | |
| 5,585,312 A | 12/1996 | Ten Eyck et al. | |
| 5,666,726 A | 9/1997 | Robinson et al. | |
| 5,714,421 A | 2/1998 | Olds et al. | |
| 5,736,109 A | 4/1998 | Howorth et al. | |
| 5,811,063 A | 9/1998 | Robinson et al. | |
| 5,811,360 A | 9/1998 | Jubb | |
| 5,821,183 A | 10/1998 | Jubb | |
| 5,853,675 A | 12/1998 | Howorth | |
| 5,862,590 A | 1/1999 | Sakashita et al. | |
| 5,869,010 A | 2/1999 | Langer | |
| 5,874,375 A | 2/1999 | Zoitos et al. | |
| 5,882,608 A | 3/1999 | Sanocki et al. | |
| 5,928,075 A | 7/1999 | Miya et al. | |
| 5,928,975 A | 7/1999 | Jubb | |
| 5,955,177 A | 9/1999 | Sanocki et al. | |
| 5,955,389 A | 9/1999 | Jubb | |
| 6,000,131 A | 12/1999 | Schmitt | |
| 6,010,668 A * | 1/2000 | Lawrence et al. | 422/176 |
| 6,025,288 A | 2/2000 | Zoitos et al. | |
| 6,030,910 A | 2/2000 | Zoitos et al. | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,231,818 B1 | 5/2001 | TenEyck | |
| 6,317,976 B1 | 11/2001 | Aranda et al. | |
| 6,589,488 B1 | 7/2003 | Eyhorn | |
| 6,726,884 B1 | 4/2004 | Dillon et al. | |
| 6,737,146 B2 | 5/2004 | Schierz et al. | |
| 6,756,107 B1 | 6/2004 | Schierz et al. | |
| 6,855,298 B2 | 2/2005 | TenEyck | |
| 6,861,381 B1 | 3/2005 | Jubb et al. | |
| 6,923,942 B1 | 8/2005 | Shirk et al. | |
| 6,953,757 B2 | 10/2005 | Zoitos et al. | |
| 7,033,412 B2 | 4/2006 | Kumar et al. | |
| 7,153,796 B2 | 12/2006 | Jubb et al. | |
| 7,259,118 B2 | 8/2007 | Jubb et al. | |
| 7,261,864 B2 | 8/2007 | Watanabe | |
| 7,387,822 B2 | 6/2008 | Dinwoodie | |
| 7,550,118 B2 | 6/2009 | Merry | |
| 7,820,117 B2 | 10/2010 | Peisert et al. | |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0185724 A1 | 10/2003 | Anji et al. | |
| 2004/0052694 A1 | 3/2004 | Nishikawa et al. | |
| 2004/0134172 A1* | 7/2004 | Kumar et al. | 55/523 |
| 2004/0234436 A1 | 11/2004 | Howorth | |
| 2005/0272602 A1 | 12/2005 | Ninomiya | |
| 2006/0153746 A1 | 7/2006 | Merry et al. | |
| 2006/0154040 A1 | 7/2006 | Merry | |
| 2006/0278323 A1 | 12/2006 | Eguchi | |
| 2007/0065349 A1* | 3/2007 | Merry | 422/179 |
| 2007/0207069 A1 | 9/2007 | Kariya et al. | |
| 2008/0253939 A1 | 10/2008 | Hornback | |
| 2009/0060800 A1 | 3/2009 | Fernandes, Jr. | |
| 2009/0060802 A1 | 3/2009 | Beauharnois | |
| 2009/0114097 A1 | 5/2009 | Saiki | |
| 2009/0162256 A1 | 6/2009 | Ten Eyck et al. | |
| 2010/0055004 A1 | 3/2010 | Olson et al. | |
| 2010/0207298 A1 | 8/2010 | Kunze et al. | |
| 2010/0209306 A1 | 8/2010 | Kunze et al. | |

FOREIGN PATENT DOCUMENTS

| | | |
|---|---|---|
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 993 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 513 808 A | 6/1978 |
| GB | 2 200 129 A | 7/1988 |
| JP | 4-083773 | 3/1992 |
| JP | 6-272549 | 9/1994 |
| JP | 7-286514 | 10/1995 |
| WO | WO 91/11498 A1 | 8/1991 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO2007143437 * | 12/2007 |
| WO | WO 2008/103525 A2 | 8/2008 |
| WO | WO 2008/154078 A1 | 12/2008 |
| WO | WO 2008/156942 A1 | 12/2008 |
| WO | WO2009048857 * | 4/2009 |
| WO | WO 2010/024920 A1 | 3/2010 |

OTHER PUBLICATIONS

International Search Report, Form PCT/ISA/210, for PCT International Patent Application No. PCT/US2010/002613 corresponding to U.S. Appl. No. 12/890,065, mailing date Nov. 30, 2010.

International Written Opinion of the International Searching Authority, form PCT/ISA/237, for PCT International Patent Application No. PCT/US2010/002613 corresponding U.S. Appl. No. 12/890,065, mailing date Nov. 30, 2010.

* cited by examiner

MULTIPLE LAYER MAT AND EXHAUST GAS TREATMENT DEVICE

This application claims the benefit of the filing date, under 35 U.S.C. §119(e), of U.S. Provisional Application for Patent Ser. No. 61/245,437, filed on Sep. 24, 2009, which is incorporated herein by reference.

Disclosed is a mat for use in an exhaust gas treatment device, such as catalytic converters and diesel particulate traps that are used in automotive exhaust systems. The mat may be used as a mounting mat to mount a fragile monolith within an outer housing of an exhaust gas treatment device or as thermal insulation in an end cone of the exhaust gas treatment device.

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

A fragile catalyst support structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of exerting an effective residual holding pressure on the fragile structure, even when the exhaust gas treatment device has undergone wide temperature fluctuations, which causes significant expansion and contraction of the metal housing in relation to the fragile structure, which in turn causes significant compression and release cycles for the mounting mats over a period of time.

Ceramic and metallic substrates used in exhaust gas treatment devices are most often mounted within a metal housing with an inorganic fiber based mounting mat. This mounting mat material may contain only inorganic fibers. However, the mounting mat material may also contain other types of fibers, organic binders, inorganic binder and intumescent materials.

A mounting mat must function across a wide range of operating temperatures to effectively hold the substrate in position. Substrates are subjected to axial forces acting on the substrate due to vibrations. The mounting mat also compensates for the fact that the metal housing expands more or less than the substrate itself. Various exhaust gas treatment devices operate throughout a temperature range of ambient conditions of about 20° C. to about 1200° C. Therefore, mounting mats must provide robust holding pressure performance across this wide temperature range.

Certain commercially available non-intumescent mounting mats typically utilize high diameter non-respirable fibers to conform to regulations. However, mounting mats comprising only high diameter non-respirable fibers have undesirably high thermal conductivity properties.

Commercially available biosoluble inorganic fibers have relatively small diameters and exhibit relatively low thermal conductivity.

What is needed in the industry is a mounting mat for exhaust gas treatment devices which can be used at high operating temperatures and which exhibits low thermal conductivity.

Disclosed herein is a mounting mat for an exhaust gas treatment device comprising a first layer comprising biosoluble inorganic fibers; and a second layer adjacent said first layer comprising inorganic fibers different from said biosoluble inorganic fibers.

According to certain embodiments, the mounting mat comprises a first layer comprising biosoluble inorganic fibers having a first mean diameter; and a second layer comprising inorganic fibers having a second mean diameter that is greater than the first mean diameter.

According to certain embodiments, the mounting mat comprises a first layer comprising biosoluble inorganic fibers and a second layer comprising non-respirable fibers.

Also disclosed is an exhaust gas treatment device comprising a housing; a fragile structure resiliently mounted within the housing; and a mounting mat disposed between said housing and said fragile structure, said mat comprising a first layer comprising biosoluble inorganic fibers; and a second layer adjacent said first layer comprising inorganic fibers different from said biosoluble inorganic fibers. According to certain embodiments, the mat comprises a first layer comprising biosoluble inorganic fibers having a first mean diameter and a second layer comprising inorganic fibers having a second mean diameter that is greater than the first mean diameter, wherein said first layer is positioned adjacent said housing and said second layer is positioned adjacent said fragile structure. According to certain embodiments, the mat comprises a first layer comprising biosoluble inorganic fibers and a second layer comprising non-respirable fibers.

Additionally disclosed is an exhaust gas treatment device comprising a housing; a fragile structure resiliently mounted within the housing; a mounting mat disposed in a gap between said housing and said fragile structure; a double walled end cone housing; and an insulation mat disposed between the walls of the end cone housing, said mat comprising a first layer comprising biosoluble inorganic fibers; and a second layer adjacent said first layer comprising inorganic fibers different from said biosoluble inorganic fibers, wherein said first layer is positioned adjacent said outer cone housing and said second layer is positioned adjacent said inner cone housing. According to certain embodiments, the mounting mat comprises a first layer comprising biosoluble inorganic fibers having a first mean diameter and a second layer comprising inorganic fibers having a second mean diameter that is greater than the first mean diameter, wherein said first layer is positioned adjacent said outer cone housing and said second layer is positioned adjacent said inner cone housing. According to certain embodiments, the mat comprises a first layer comprising biosoluble inorganic fibers and a second layer comprising non-respirable fibers.

Further disclosed is an end cone for an exhaust gas treatment device comprising an outer metallic cone; an inner metallic cone; and an insulation mat disposed between the walls of the end cone housing, said mat comprising a first layer comprising biosoluble inorganic fibers; and a second layer adjacent said first layer comprising inorganic fibers different from said biosoluble inorganic fibers, wherein said first layer is positioned adjacent said outer cone housing and said second layer is positioned adjacent said inner cone housing. According to certain embodiments, the mounting mat comprises a first layer comprising biosoluble inorganic fibers having a first mean diameter and a second layer comprising inorganic fibers having a second mean diameter that is greater than the first mean diameter, wherein said first layer is positioned adjacent said outer cone housing and said second layer is positioned adjacent said inner cone housing. According to certain embodiments, the mat comprises a first layer comprising biosoluble inorganic fibers and a second layer comprising non-respirable fibers.

The hybrid mat may comprise a multiple layer mounting mat for use in an exhaust gas treatment device. The multiple layer mounting mat may include a first layer of biosoluble inorganic fibers and a separate and distinct layer of inorganic fibers that are different in chemical composition from the biosoluble inorganic fibers of the first layer.

The multiple layer mounting mat may comprise a first separate and distinct layer of biosoluble inorganic fibers and a second separate and distinct layer of inorganic fibers that are different in chemical composition from the biosoluble inorganic fibers of the first layer that are brought into adjacent contact to form a multiple layer mat. The multiple layer mounting mat may comprise a first separate and distinct layer of biosoluble inorganic fibers and a second separate and distinct layer of inorganic fibers that are different in chemical composition from the biosoluble inorganic fibers of the first layer that are joined together by any suitable means to form a multiple layer mat. According to alternative embodiments, the multiple layer mounting mat may be achieved by forming a first layer of biosoluble inorganic fibers followed by forming a second distinct layer of inorganic fibers that are different in chemical composition from the biosoluble inorganic fibers of the first layer directly onto the first layer of biosoluble inorganic fibers.

The multiple layer mounting mat may comprise a first layer of biosoluble inorganic fibers having a first mean diameter and a second layer of inorganic fibers having a second mean diameter that is different from the first mean diameter. According to certain embodiments, the multiple layer mounting mat includes a first layer of biosoluble inorganic fibers and a second layer comprising of inorganic fibers having a mean diameter that is greater than the mean diameter of the biosoluble fibers in the first layer of the mounting mat. The multiple layer mounting mat is positioned between the exterior surfaces of a fragile structure, such as a fragile monolithic catalyst support substrate or a diesel particulate filter, and the inner surfaces of a housing. According to other embodiments, the multiple layer mat may also be used as thermal insulation positioned between two housings of an end cone of an exhaust gas treatment device.

According to certain embodiments, the multiple layer mounting mat may comprise a first layer of fibers having a mean diameter of less than about 6 microns and a second layer of fibers having a mean diameter of greater than about 6 microns.

According to certain illustrative embodiments, the multiple layer mounting mat may include a first layer of biosoluble inorganic fibers having a mean diameter less than about 6 microns and a second layer of sol-gel derived inorganic fibers that are different in chemical composition from the biosoluble inorganic fibers of the first layer, and wherein the fibers of the second layer have a mean diameter of greater than about 6 microns. The mounting mat may be disposed within the exhaust gas treatment device in a manner such that the second layer of fibers is positioned adjacent the fragile structure and the layer of biosoluble inorganic fibers is positioned adjacent the inner surfaces of the outer metal housing.

According to certain illustrative embodiments, the multiple layer mounting mat may include a first layer of biosoluble inorganic fibers having a mean diameter less than about 6 microns and a second layer of non-respirable inorganic fibers having a mean diameter of greater than about 6 microns and a thermal conductivity which is higher than the thermal conductivity of the first layer. The mounting mat may be disposed within the exhaust gas treatment device in a manner such that the second layer of fibers is positioned adjacent the fragile structure and the layer of biosoluble inorganic fibers is positioned adjacent the inner surfaces of the outer metal housing.

The exhaust gas treatment device generally includes a housing, a fragile structure located within the housing, and a multiple layer mounting mat disposed between the housing and the fragile structure for resiliently holding the fragile monolith in proper position within the housing. The multiple layer mounting mat may include a first layer of biosoluble inorganic fibers and a second layer comprising inorganic fibers having a mean diameter that is greater than the mean diameter of the biosoluble inorganic fibers in the first layer of the mounting mat. The first layer of the multiple layer mat may be positioned adjacent the inner surfaces of the housing and the second layer may be positioned adjacent the outer surfaces of the fragile structure.

Further disclosed is an end cone for an exhaust gas treatment device. The end cone comprises an outer metallic cone housing, an inner metallic cone housing, and a multiple layer insulation mat disposed between the end cone housings. The multiple layer mounting mat may include a first layer of biosoluble inorganic fibers and a second layer comprising inorganic fibers having a mean diameter that is greater than the mean diameter of the biosoluble inorganic fibers in the first layer of the mounting mat. The first layer of the multiple layer mat may be positioned adjacent the outer surfaces of the inner cone housing and the second layer may be positioned adjacent the inner surfaces of the outer cone housing.

According to certain illustrative embodiments, the exhaust gas treatment device comprises a housing, a fragile structure positioned within the housing, a mounting mat disposed in a gap between the housing and the fragile structure for resiliently holding the fragile monolith in proper position within the housing, and a double walled end cone housing. A multiple layer mounting mat is also disposed between the inner and outer cone housings of the double walled end cone. The multiple layer mounting mat includes a first layer of biosoluble inorganic fibers and a second layer comprising inorganic fibers having a mean diameter that is greater than the mean diameter of the biosoluble inorganic fibers in the first layer of the mounting mat. The first layer of the multiple layer mat is positioned adjacent the inner surfaces of the outer cone housing and the second layer is positioned adjacent the outer surfaces of the inner cone housing.

In certain embodiments, the layer of the mounting mat comprising the higher diameter non-respirable inorganic fibers has a higher thermal conductivity as compared to the layer of lower diameter biosoluble inorganic fibers. However, the layer of higher diameter non-respirable inorganic fibers is able to withstand higher temperatures as compared to the layer of lower diameter biosoluble inorganic fibers. The multiple layer mounting mat is positioned in a manner such that the layer of high diameter non-respirable inorganic fibers is positioned adjacent the exterior surfaces of the fragile structure (i.e., adjacent the exterior surfaces of the fragile catalyst support structure of a catalytic converter or adjacent the exterior surfaces of a diesel particulate filter of a diesel particulate trap). The layer of the biosoluble inorganic fibers is positioned adjacent the inner surfaces of the outer housing of the exhaust gas treatment device. Thus, the layer higher diameter non-respirable inorganic fibers interfaces with the "hot side" and the layer of lower diameter biosoluble inorganic fibers interfaces with the "cold side" adjacent the outer housing of the device. The high diameter inorganic fibers of the layer adjacent the fragile structure can withstand the higher temperatures encountered at the interface of the fragile structure (i.e., at the interface between the fragile catalyst support structure or diesel particulate filter and the layer of high diameter non-respirable fibers). Thus, the multiple layer mounting mat comprises layers of inorganic fibers that conform to regulations relating to "green" fibers (i.e., non-respirable and/or biosoluble fibers). The multiple layer mounting mat is useful at the high operating temperatures encountered during the normal operation of exhaust gas treatment devices, such as experienced in catalytic converters and diesel particulate filters, while maintaining a suitably low thermal conductivity.

A substrate is a component in an exhaust gas treatment device which modifies exhaust material. There are many kinds of exhaust gas treatment devices which may comprise a substrate. One type of exhaust gas treatment device is a catalytic converter. The active portion of a catalytic converter comprises a substrate coated or impregnated with a catalyst to promote oxidation of carbon monoxide and hydrocarbons and the reduction of oxides of nitrogen, eliminating undesired products of combustion in the exhaust stream.

Substrate monoliths are typically oval or round in cross-sectional configuration, but other shapes are possible. The substrate is spaced from its housing by a gap width distance which will vary according to the type and design of the device utilized, e.g., a catalytic converter, a diesel catalyst structure, or a diesel particulate trap. In some embodiments the gap can be at least about 0.05 inch (1.27 mm), and in other embodiments the gap can be up to about one inch (25.4 mm) or more. This gap width may typically range from about 3 mm to about 25 mm with a range of about 3 mm to about 8 mm being commercially common widths. The substrate mounting system is disposed in this space to provide both thermal insulation to the external environment and mechanical support to the ceramic monolith substrate, protecting the substrate from damage due to mechanical shock.

A diesel particulate filter is another type of exhaust gas treatment device. The active portion of a diesel particulate filter comprises a substrate acting as a filter. A diesel particulate trap may include one or more porous tubular or honeycomb-like structures (having channels closed at one end, however), which are mounted by a thermally resistant material within a housing. Particulate is collected from exhaust gases in the porous structure, typically until regenerated by a high temperature burnout process.

Another type of exhaust gas treatment device is a selective catalyst reduction unit. The active portion of a selective catalyst reduction unit comprises a substrate coated with a catalyst to promote chemical reduction and elimination of undesired products in the exhaust stream.

Another type of exhaust gas treatment device is a $NO_x$ trap. The active portion of a $NO_x$ trap comprises a catalytic substrate comprising alkali or alkaline earth materials. The trap operates in a cyclic manner; cycling between a "sorbtion" process and a "regeneration" process. During sorbtion the substrate intakes $NO_x$ species and traps them on the surface of the catalytic substrate as nitrate species. During regeneration, a reducing material is introduced into the $NO_x$ trap and the nitrate species are removed from the substrate and reduced to nitrogen.

Non-automotive applications for the subject mounting system include but are not limited to catalytic converters for chemical industry emission (exhaust) stacks.

In an exhaust gas treatment device, the substrate may operate at temperatures substantially above ambient temperature (about 20° C.). Without limitation, the operating temperature for certain embodiments of exhaust gas treatment devices is about 1000° C. Because of the substantially elevated temperatures at which it operates, the substrate typically comprises materials having excellent resistance to heat: a very high melting point, and very low thermal expansion coefficient. There are many materials which have these properties including a wide variety of ceramics, tungsten, rhenium, and more exotic materials. One group of very common materials which exhibit excellent resistance to heat is ceramics. Exhaust gas treatment device substrates typically comprise a frangible material, such as a monolithic structure formed of a brittle, fireproof ceramic material such as, but not limited to, aluminum oxide, silicon dioxide, magnesium oxide, zirconia, cordierite, silicon carbide and the like.

A property of many common ceramics is their low toughness. That is, while many ceramics are hard, strong, or both hard and strong, ceramics tend to display low toughness and tend to fracture at low strain levels. This makes ceramic components prone to breakage or fracture under mechanical loading conditions typically experienced by an exhaust gas treatment device during thermal cycling. Therefore, it is common to incorporate means to protect the substrate.

A housing is a hollow body which at least partially surrounds or shrouds the substrate. The housing protects the substrate from impact, torsion, tension, compression, or other mechanical loading which may damage the substrate. In certain embodiments the housing comprises a thin shell. The housing comprises materials having good resistance to heat: a high melting point and high heat resistance. The materials comprising exhaust gas treatment device housings are commonly ductile materials comprising a lower heat resistance than the monolith, a higher thermal expansion coefficient than the monolith, and a higher impact resistance than the monolith. Without limitation, in certain embodiments the exhaust gas treatment device housing comprises a metal or metal alloy, such as high temperature-resistant steel.

The term "biosoluble" inorganic fibers refer to inorganic fibers that are soluble or otherwise decomposable in a physiological medium or in a simulated physiological medium, such as simulated lung fluid. The solubility of the fibers may be evaluated by measuring the solubility of the fibers in a simulated physiological medium over time. A method for measuring the biosolubility (i.e. the non-durability) of the fibers in physiological media is disclosed U.S. Pat. No. 5,874,375 assigned to Unifrax, which is incorporated herein by reference. Other methods are suitable for evaluating the biosolubility of inorganic fibers. According to certain embodiments, the biosoluble fibers exhibit a solubility of at least 30 $ng/cm^2$-hr when exposed as a 0.1 g sample to a 0.3 ml/min flow of simulated lung fluid at 37° C. According to other embodiments, the biosoluble inorganic fibers may exhibit a solubility of at least 50 ng/cm$^2$-hr, or at least 100 n g/cm$^2$-hr, or at least 1000 ng/cm2-hr when exposed as a 0.1 g sample to a 0.3 ml/min flow of simulated lung fluid at 37° C.

Without limitation, suitable examples of biosoluble inorganic fibers that can be used to prepare a mounting mat for an exhaust gas treatment device include those biosoluble inorganic fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, each of which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and about 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and about 5 weight percent or less impurities. According to other embodiments, the alkaline earth silicate fibers comprise the fiberization product of about 70 to about 86 weight percent silica, about 14 to about 30 weight percent magnesia, and about 5 weight percent or less impurities. More information on magnesia-silicate fibers can be found in U.S. Pat. No. 5,874,375, which is hereby incorporated by reference.

A suitable magnesium-silicate fiber is commercially available from Unifrax I LLC (Niagara Falls, N.Y.) under the registered trademark ISOFRAX®. Commercially available ISOFRAX® fibers generally comprise the fiberization product of about 70 to about 80 weight percent silica, about 18 to about 27 weight percent magnesia and about 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silicate fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and about 10 weight percent or less impurities. Typically, biosoluble calcia-magnesia-silicate fibers comprise about 15 to about 35 weight percent calcia, about 2.5 to about 20 weight percent magnesia, and about 60 to about 70 weight percent silica.

Useful calcia-magnesia-silicate fibers are commercially available from Unifrax I LLC (Niagara Falls, N.Y.) under the registered trademark INSULFRAX®. INSULFRAX® fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Georgia) under the trade designations SUPERWOOL® 607 and SUPERWOOL® 607 MAX. SUPERWOOL® 607 fibers comprise about 60 to about 70 weight percent silica, from about 25 to about 35 weight percent calcia, from about 4 to about 7 weight percent magnesia, and trace amounts of alumina. SUPERWOOL® 607 MAX fibers comprise about 60 to about 70 weight percent silica, from about 16 to about 22 weight percent calcia, from about 12 to about 19 weight percent magnesia, and trace amounts of alumina.

The layer of non-respirable fibers may comprise sol-gel derived fibers. Sol-gel derived fibers are made by dissolving oxide precursors in liquid and spinning to form a fiber. The spun fiber is dried and calcined to form the final oxide fiber. The spinning step may be accomplished via centrifugal spinning, drawing, blowing, tack-spinning, extrusion of the liquid through a spinneret or suitable combinations thereof. U.S. Pat. Nos. 4,159,205 and 4,277,269 discuss various methods of making sol-gel derived fibers. Suitable sol-gel derived fibers include, without limitation, alumina fibers, high alumina fibers and mullite fibers. In certain embodiments, alumina fibers may comprise at least about 60% by weight alumina. In certain embodiments, high alumina fibers may comprise at least about 95% by weight alumina, the remainder typically being silica, but perhaps additional oxides. In certain embodiments, mullite fibers may comprise about 72% by weight alumina and about 28% by weight silica, optionally with additional oxides present in small amounts.

The layer of non-respirable fibers may comprise leached glass fibers. According to certain embodiments, leached glass fibers may have a silica content of at least about 67 percent by weight. In certain embodiments, the leached glass fibers contains at least about 90 percent by weight, and in certain of these, from about 90 percent by weight to less than about 99 percent by weight silica. The mean fiber diameter of these leached glass fibers may be about 6 microns. On average, the glass fibers typically have a mean diameter of about 9 microns, up to about 14 microns. Thus, these leached glass fibers are non-respirable.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX® and from Hitco Carbon Composites, Inc. of Gardena Calif., under the registered trademark REFRASIL®, and from Polotsk-Steklovolokno, Republic of Belarus, under the designation PS-23®.

The BELCOTEX® fibers are standard type, staple fiber pre-yarns. These fibers have an average fineness of about 550 tex and are generally made from silicic acid modified by alumina. The BELCOTEX® fibers are amorphous and generally contain about 94.5 silica, about 4.5 percent alumina, less than about 0.5 percent sodium oxide, and less than about 0.5 percent of other components. These fibers have an average fiber diameter of about 9 microns and a melting point in the range of about 1500° C. to about 1550° C. These fibers are heat resistant to temperatures of up to 1100° C., and are typically shot free and binder free.

The REFRASIL® fibers, like the BELCOTEX® fibers, are amorphous leached glass fibers high in silica content for providing thermal insulation for applications in the 1000° C. to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of about 1 percent or less.

The PS-23® fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL® fibers, have a melting point of about 1700° C.

In certain embodiments, non-respirable fibers are fibers which have a mean diameter of about 3 µm or greater. In other illustrative embodiments, non-respirable fibers are fibers which have a mean diameter of about 6 µm or greater. Further, fibers characterized by a fiber length greater than about 100 µm have been shown in certain studies to be non-respirable, independent of the fiber diameter. Other studies have shown that fibers characterized by a fiber length greater than about 200 to about 250 pm are non-respirable, independent of the fiber diameter.

In certain embodiments, one or more layers of the mounting mat may comprise intumescent material, or may comprise a distinct intumescent layer. The intumescent material may include at least one of unexpanded vermiculite, hydrobiotite, water-swelling tetrasilicic fluorine mica, alkaline metal silicates, or expandable graphite, and may be formed into a sheet using organic and/or inorganic binders to provide a desirable degree of wet strength. A sheet of intumescent material can be produced by standard paper making techniques as described, for example, in U.S. Pat. No. 3,458,329, the disclosure of which is incorporated herein by reference.

A flexible, resilient, intumescent fibrous mounting mat can be produced in several different ways, including a conventional paper-making process, either hand laid or machine laid. A handsheet mold, a Fourdrinier paper machine, or a rotoformer paper machine can be employed to make the flexible, intumescent fibrous mounting mat. In any case, a flocculated aqueous slurry containing a number of components is pressed to remove most of the water, and the mat is then dried. This process is well known to those skilled in the art.

In other embodiments, the flexible, fibrous mounting mat may comprise a substantially non-expanding composite sheet of high temperature resistant fibers and a binder. In certain embodiments, the mounting mat is "integral", meaning that after manufacture the mounting mat has self supporting structure, needing no reinforcing or containment layers of fabric, plastic or paper, (including those which are stitch-bonded to the mat) and can be handled or manipulated without disintegration. By "substantially non-expanding" is meant that the sheet does not readily expand upon the application of heat as would be expected with an intumescent layer. Of course, some expansion of the sheet does occur based upon its thermal coefficient of expansion. The amount of expansion, however, is insubstantial as compared to the expansion which occurs based upon intumescent properties. It will be appreciated that these substantially non-expanding mounting mats are substantially devoid of intumescent materials.

The binder used in the non-expanding mounting mat is typically an organic binder which may be sacrificial in nature. By "sacrificial" is meant that the binder will eventually be burned out of the mounting mat as the temperature of the mounting mat increases to operating temperatures for the first time, leaving only the fibers and other optional components as the final mounting mat. Suitable binders include aqueous and nonaqueous binders, but often the binder utilized is a reactive, thermally setting latex which after cure is a flexible material that can be burned out of the installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Specific useful binders include but are not limited to HI-STRETCH V-60™, B.F. Goodrich Co. (Akron, Ohio) for acrylonitrile based latex. Solvents for the binders can include water, or a suitable organic solvent, such as acetone. Solution strength of the binder in the solvent (if used) can be determined by conventional methods based on the binder loading desired and the workability of the binder system (viscosity, solids content, etc.).

Similarly, the non-expanding mounting mat can be prepared by conventional papermaking techniques. Using this process, the inorganic fibers are mixed with a binder to form a mixture or slurry. The slurry may then be diluted with water to enhance formation, and it may finally be flocculated with flocculating agent and drainage retention aid chemicals. Then, the flocculated mixture or slurry may be placed onto a papermaking machine to be formed into a ceramic paper mat. The mats or sheets may be formed by vacuum casting the slurry or mixture with conventional papermaking equipment and may be dried in ovens.

Alternatively, the fibers may be processed into a mat by conventional means such as dry air laying. The mat, at this stage, has very little structural integrity and is very thick relative to the conventional catalytic converter and diesel trap mounting mats. Where this alternative technique is used, the mat may be further processed by the addition of a binder to the mat by impregnation to form a discontinuous fiber composite. The binder is added after formation of the mat, rather than forming the mat as noted herein with respect to the conventional papermaking technique.

Optionally, the non-intumescent mounting mat includes a binder. Suitable binders may include aqueous and non aqueous binders, but the binder utilized may be a reactive, thermally setting latex which after cure is a flexible material that is stable up to at least about 350° C. About 5 to about 10 percent latex may be employed.

Either a single type of binder or mixture of more than one type of binder may be included within the mounting mat. Suitable binders include organic binders, inorganic binders and mixtures of these two types of binders. According to certain embodiments, the intumescent or non-intumescent mounting mats include one or more organic binders. The organic binders may be provided as a solid, a liquid, a solution, a dispersion, a latex, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 0.5 to about 15 weight percent, from about 1 to about 10 weight percent, or from about 2 to about 8 weight percent, based on the total weight of the mounting mat.

The mounting mat may include polymeric binder fibers instead of, or in combination with, the resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat treated fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

When an organic binder is used, the components are mixed to form a mixture or slurry. The slurry of fibers and binder is then formed into a mat structure and the binder is removed, thereby providing a mounting mat containing the heat-treated fibers (and optionally additional fibers). Typically, a sacrificial binder is employed to initially bond the fibers together. By "sacrificial", it is meant that the organic binder will eventually be burned out of the mounting mat, leaving only the heat treated fibers (and other ceramic or glass fibers, if used) as the mounting mat for supporting the fragile structure.

In addition to organic binders, the mounting mats may also include inorganic binder material. Without limitation, suitable inorganic binder materials include inorganic particulate materials, colloidal dispersions of alumina, silica, zirconia, and mixtures thereof.

The mounting mat may be prepared by any known techniques commonly used in the preparation of mounting mats. For example, using a papermaking process, the fibers may be mixed with a binder or other binder fibers to form a mixture or slurry. The fibrous components may be mixed at about 0.25% to about 5% consistency or solids content (about 0.25 to about 5 parts solids to about 99.75 to about 95 parts water). The slurry may then be diluted with water to enhance formation, and it may finally be flocculated with a flocculating agent and drainage retention aid chemicals. The flocculated mixture or slurry may be placed onto a papermaking machine to be formed into a ply or sheet of fiber containing paper. Alternatively, the plies or sheets may be formed by vacuum casting the slurry. In either case, the plies or sheets may be dried in ovens. For a more detailed description of standard papermaking techniques employed, see U.S. Pat. No. 3,458,329, the disclosure of which is incorporated herein by reference.

In other embodiments, the heat treated fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a fiber composite. In this technique, the binder is added after formation of the mat, rather than forming the mat as noted herein with respect to the conventional papermaking technique.

Methods of impregnation of the mat with the binder include complete submersion of the mat in a liquid binder system, or alternatively brushing, coating, dipping, rolling, splashing, or spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat is then passed between press rolls, which remove excess liquid and densify the mat to approximately its desired thickness. The densified mat may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the mat and pressing to remove excess liquid, thereafter drying to form the composite and storing or cutting to size It is noted that mounting mats produced from these fibers may be too low in density for easy use in certain catalytic converter applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the desired form.

Regardless of which of the above-described techniques are employed, the mounting mat may be cut, such as by die stamping, to form mounting mats of exact shapes and sizes with reproducible tolerances. The mounting mat exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure or like fragile structure without cracking, and then disposed within the catalytic converter housing. Generally, the mounting mat-wrapped fragile structure can be inserted into a housing or the housing can be built or otherwise fabricated around the mounting mat-wrapped fragile structure.

As an exhaust gas treatment device cycles from ambient temperature to operating temperature, the components comprising the device reach their individual operating temperatures. The operating temperature for any given component in the exhaust gas treatment device may be less than the operating temperature for the device itself, because some components are insulated from higher temperature components. As components heat, they will expand in proportion to their thermal expansion coefficients.

While the mat and exhaust gas treatment device have been described in connection with various embodiments, as shown in the various figures, it is to be understood that other similar embodiments may be used or modifications and additions may be made to the described embodiments for performing the same function. Furthermore, the various illustrative embodiments may be combined to produce the desired results. Therefore, the mat and exhaust gas treatment device should not be limited to any single embodiment, but rather construed in breadth and scope in accordance with the recitation of the appended claims.

The invention claimed is:

1. An exhaust gas treatment device comprising: a housing; a fragile structure resiliently mounted within the housing; and a mounting mat disposed between said housing and said fragile structure, said mat comprising: a first layer consisting essentially of biosoluble inorganic fibers having a first mean diameter and a second layer adjacent said first layer consisting essentially of substantially non-respirable sol-gel derived inorganic fibers comprising at least about 60% by weight alumina and having a second mean diameter that is greater than said first mean diameter, wherein said first layer is positioned adjacent said housing and said second layer is positioned adjacent said fragile structure.

2. The exhaust gas treatment device 1, wherein said biosoluble fibers comprise calcium-aluminate fibers, calcia-magnesia-silica fibers, magnesia-silica fibers or combinations thereof.

3. The exhaust gas treatment device of claim 2, wherein said magnesia-silica fibers comprise the fiberization product of about 65 to about 86 weight percent silica, from about 14 to about 35 weight percent magnesia and about 5 weight percent or less impurities.

4. The exhaust gas treatment device of claim 1, wherein said calcia-magnesia-silica fibers comprise the fiberization product of about 45 to about 90 weight percent silica, greater than 0 to about 45 weight percent calcia, and greater than 0 to about 35 weight percent magnesia.

5. The exhaust gas treatment device of claim 1, wherein said sol-gel derived fibers comprise alumina fibers.

6. The exhaust gas treatment device of claim 1, wherein said sol-gel derived fibers comprise mullite fibers.

7. An exhaust gas treatment device comprising: a housing; a fragile structure resiliently mounted within the housing; and a mounting mat disposed in a gap between said housing and said fragile structure; a double walled end cone housing comprising inner and outer cone housings; and an insulation mat disposed between the walls of said end cone housing, said insulation mat comprising a first layer consisting essentially of biosoluble inorganic fibers having a first mean diameter and a second layer consisting essentially of substantially non-respirable sol-gel derived inorganic fibers comprising at least about 60% by weight alumina and having a second mean diameter that is greater than said first mean diameter, wherein said first layer is positioned adjacent said outer cone housing and said second layer is positioned adjacent said inner cone housing.

8. The exhaust gas treatment device of claim 7, wherein said first layer comprises biosoluble inorganic fibers having a first mean diameter and said second layer comprises substantially non-respirable fibers having a second mean diameter that is greater than said first mean diameter.

9. The exhaust gas treatment device of claim 7, wherein said biosoluble fibers comprise calcium-aluminate fibers, calcia-magnesia-silica fibers, magnesia-silica fibers or combinations thereof.

10. The exhaust gas treatment device of claim 9, wherein said magnesia-silica fibers comprising the fiberization product of about 65 to about 86 weight percent silica, from about 14 to about 35 weight percent magnesia and about 5 weight percent or less impurities.

11. The exhaust gas treatment device of claim 9, wherein said calcia-magnesia-silica fibers comprise the fiberization product of about 45 to about 90 weight percent silica, greater than 0 to about 45 weight percent calcia, and greater than 0 to about 35 weight percent magnesia.

12. The exhaust gas treatment device of claim 7, wherein said inorganic fibers of said second layer comprise sol-gel derived fibers.

13. The exhaust gas treatment device of claim 12, wherein said sol-gel derived fibers comprise high alumina fibers.

14. The exhaust gas treatment device of claim 12, wherein said sol-gel derived fibers comprise mullite fibers.

15. An end cone for an exhaust gas treatment device comprising: an outer metallic cone; an inner metallic cone; and an insulation mat disposed between said inner and outer metallic cones of the end cone housing, said mat comprising a first layer consisting essentially of biosoluble inorganic fibers having a first mean diameter and a second layer consisting essentially of substantially non-respirable sol-gel derived inorganic fibers comprising at least about 60% by weight alumina and having a second mean diameter that is greater than said first mean diameter, wherein said first layer is positioned adjacent said outer metallic cone and said second layer is positioned adjacent said inner metallic cone.

16. The end cone of claim 15, wherein the first layer comprises biosoluble inorganic fibers having a first mean diameter and the second layer comprises substantially non-respirable fibers having a second mean diameter that is greater than said first mean diameter.

17. The end cone of claim 15, wherein said biosoluble fiber comprise calcium-aluminate fibers, calcia-magnesia-silica fibers, magnesia-silica fibers and combinations thereof.

18. The end cone of claim 17, wherein said magnesia-silica fibers comprising the fiberization product of about 65 to about 86 weight percent silica, from about 14 to about 35 weight percent magnesia and about 5 weight percent of less impurities.

19. The end cone of claim 17, wherein said calcia-magnesia-silica fibers comprising the fiberization product of about 45 to about 90 weight percent silica, greater than 0 to about 45 weight percent calcia, and greater than 0 to about 35 weight percent magnesia.

20. The end cone of claim 16, wherein said inorganic fibers of said second layer comprise sol-gel derived fibers.

21. The end cone of claim 20, wherein said sol-gel derived fibers comprise high alumina fibers.

22. The end cone of claim 20, wherein said sol-gel derived fibers comprises mullite fibers.

23. The mat of claim 1, wherein said first mean diameter is less than about 6 μm and said second mean diameter is 6 μm or greater.

24. The exhaust gas treatment device of claim 1, wherein said first mean diameter is less than about 6 μm and said second mean diameter is 6 μm or greater.

25. The exhaust gas treatment device of claim 8, wherein said first mean diameter is less than about 6 μm and said second mean diameter is 6 μm or greater.

26. The end cone of claim 16, wherein said first mean diameter is less than about 6 μm and said second mean diameter is 6 μm or greater.

27. The mat of claim 1, wherein the substantially non-respirable sol-gel derived inorganic fibers have a mean diameter of about 3 μm or greater.

28. The exhaust gas treatment device of claim 1, wherein the substantially non-respirable sol-gel derived inorganic fibers have a diameter of about 3 μm or greater.

29. The exhaust gas treatment device of claim 7, wherein the inorganic fibers of the second layer have a diameter of about 3 μm or greater.

30. The end cone of claim 15, wherein the inorganic fibers of the second layer have a diameter of about 3 μm or greater.

31. A mat comprising: a first layer consisting essentially of biosoluble inorganic fibers having a first mean diameter and a second layer adjacent said first layer consisting essentially of substantially non-respirable sol-gel derived inorganic fibers comprising at least about 60% by weight alumina and having a second mean diameter that is greater than said first mean diameter.

32. The mat of claim 31, wherein said biosoluble fibers comprise calcium aluminate fibers, calcia-magnesia-silica fibers, magnesia-silica fibers or combinations thereof.

33. The exhaust gas treatment device of claim 32, wherein said magnesia-silica fibers comprise the fiberization product of about 65 to about 86 weight percent silica, from about 14 to about 35 weight percent magnesia and about 5 weight percent or less impurities.

34. The exhaust gas treatment device of claim 32, wherein said calcia-magnesia-silica fibers comprise the fiberization product of about 45 to about 90 weight percent silica, greater than 0 to about 45 weight percent calcia, and greater than 0 to about 35 weight percent magnesia.

35. The mat of claim 31, wherein said sol-gel derived fibers comprise mullite fibers.

* * * * *